(12) United States Patent
Tanaka et al.

(10) Patent No.: US 7,957,099 B2
(45) Date of Patent: Jun. 7, 2011

(54) THERMALLY ASSISTED MAGNETIC HEAD WITH OPTICAL WAVEGUIDE AND LIGHT SHIELD

(75) Inventors: Kosuke Tanaka, Tokyo (JP); Yasuhiro Ito, Tokyo (JP); Koji Shimazawa, Tokyo (JP)

(73) Assignee: TDK Corporation, Tokyo (JP)

( * ) Notice: Subject to any disclaimer, the term of this patent is extended or adjusted under 35 U.S.C. 154(b) by 517 days.

(21) Appl. No.: 12/182,738

(22) Filed: Jul. 30, 2008

(65) Prior Publication Data
US 2009/0052077 A1    Feb. 26, 2009

(30) Foreign Application Priority Data
Aug. 23, 2007 (JP) ................................. 2007-217406

(51) Int. Cl.
*G11B 5/02* (2006.01)
(52) U.S. Cl. ................................................. 360/125.74
(58) Field of Classification Search .............. 360/125.74
See application file for complete search history.

(56) References Cited

U.S. PATENT DOCUMENTS

| | | | | |
|---|---|---|---|---|
| 7,538,978 B2* | 5/2009 | Sato et al. | ...................... | 360/128 |
| 7,609,480 B2* | 10/2009 | Shukh et al. | .............. | 360/125.74 |
| 7,710,686 B2* | 5/2010 | Kim et al. | .................. | 360/125.3 |
| 7,729,085 B2* | 6/2010 | Jin et al. | .................... | 360/125.31 |
| 7,791,838 B2* | 9/2010 | Sato et al. | ................ | 360/125.02 |
| 2004/0081030 A1* | 4/2004 | Jang et al. | .................. | 369/13.17 |
| 2006/0187564 A1 | 8/2006 | Sato et al. | | |

FOREIGN PATENT DOCUMENTS
JP    A-2006-185548    7/2006

* cited by examiner

*Primary Examiner* — Mark Blouin
(74) *Attorney, Agent, or Firm* — Oliff & Berridge, PLC

(57) ABSTRACT

A thermally assisted magnetic head which can realize high-density writing onto magnetic recording media is provided.

The thermally assisted magnetic head includes a magnetic head part having a medium-opposing surface and a back face opposing the medium-opposing surface. The magnetic head part has a recording head part, an optical waveguide, and light shields. The optical waveguide extends along the opposing direction of the medium-opposing surface and back face. Each of the light shields extends along the opposing direction of the medium-opposing surface and back face and inhibits laser light from passing between the medium-opposing surface and back face. The optical waveguide and light shields are arranged on a first line when seen from the back face. When seen from the back face, the light shields oppose each other while interposing the first line therebetween and are arranged on a second line substantially orthogonal to the first line.

7 Claims, 13 Drawing Sheets

THERMALLY ASSISTED MAGNETIC HEAD WITH OPTICAL WAVEGUIDE AND LIGHT SHIELD

BACKGROUND OF THE INVENTION

1. Field of the Invention

The present invention relates to a thermally assisted magnetic head which writes signals by a thermally assisted magnetic recording scheme, a head gimbal assembly (HGA) equipped with this thermally assisted magnetic head, and a hard disk drive equipped with the HGA.

2. Related Background Art

As hard disk drives have been increasing their recording density, thin-film magnetic heads have been required to further improve their performances. As the thin-film magnetic heads, those of composite type having a structure in which a magnetism detecting device such as a magnetoresistive (M) device and a magnetic recording device such as electromagnetic coil device are laminated have been in wide use, while these devices read/write data signals from/onto magnetic disks which are magnetic recording media.

In general, a magnetic recording medium is a sort of discontinuous body in which magnetic fine particles are assembled, while each magnetic fine particle has a single-domain structure. Here, one recording bit is constituted by a plurality of magnetic fine particles. Therefore, for enhancing the recording density, it is necessary to make the magnetic fine particles smaller, so as to reduce irregularities at boundaries of recording bits. When the magnetic fine particles are made smaller, however, their volume decreases, so that the thermal stability in magnetization may deteriorate, thereby causing a problem. An index of the thermal stability in magnetization is given by $K_U V/k_B T$. Here, $K_U$ is the magnetic anisotropy energy of a magnetic fine particle, V is the volume of one magnetic fine particle, $k_B$ is the Boltzmann constant, and T is the absolute temperature. Making the magnetic fine particles smaller just reduces V, which lowers $K_U V/k_B T$ by itself, thereby worsening the thermal stability. Though $K_U$ may be made greater at the same time as measures against this problem, the increase in $K_U$ enhances the coercivity of the magnetic recording medium. On the other hand, the writing magnetic field intensity caused by a magnetic head is substantially determined by the saturated magnetic flux of a soft magnetic material constituting a magnetic pole within the head. Therefore, no writing can be made if the coercivity exceeds a permissible value determined by the limit of writing magnetic field intensity.

Proposed as a method for solving such a problem in thermal stability of magnetization is a so-called thermally assisted magnetic recording scheme which applies heat to a magnetic recording medium immediately before applying a writing magnetic field, while using a magnetic material having a large value of $K_U$, so as to effect writing with lowered coercivity. This scheme is roughly classified into magnetic dominant recording and optical dominant recording. In the magnetic dominant recording, the writing is attributed to an electromagnetic coil device, while the radiation diameter of light is greater than the track width (recording width). In the optical dominant recording, in contrast, the writing is attributed to a light-radiating part, while the radiation diameter of light is substantially the same as the track width (recording width). Namely, the magnetic dominant recording and optical dominant recording impart space resolution to a magnetic field and light, respectively.

As such a thermally assisted magnetic head recording apparatus, Patent Document 1 discloses a thermally assisted magnetic head comprising a slider having a magnetic head part in which an optical waveguide is provided at a position near an electromagnetic coil device in the laminating direction of the magnetic head (bit length direction), and a light source unit in which a light source is provided on a light source supporting substrate different from the slider. In this structure, light emitted from a light-emitting device is introduced into the optical waveguide and then is let out from a light exit surface of the optical waveguide within the medium-opposing surface, so as to heat a magnetic recording medium locally. Subsequently, the electromagnetic coil device applies a writing magnetic field to a local area of the magnetic recording medium having lowered the coercivity by the local heating, so as to perform writing.

[Patent Document 1] Japanese Patent Application Laid-Open No. 2006-185548

SUMMARY OF THE INVENTION

For making the thermally assisted magnetic head described in Patent Document 1, it is necessary for the light source unit to be overlaid on and then secured to the surface (back face) of the slider on the side opposite from the medium-opposing surface. In this case, after testing the slider having the magnetic head part and the light source unit independently from each other, the slider and light source unit that have been found nondefective are secured to each other, whereby the thin-film magnetic head can be made with a favorable yield. Since the light source can be provided at a position distanced from the medium-opposing surface while being in the vicinity of the slider, there are substantially no problems concerning decreases in light propagation efficiency, complexity in the structure of the whole apparatus, and the like.

In the case where the slider and the light source unit are made separately from each other as mentioned above, however, it is necessary to accurately align the light source and the optical waveguide with each other when securing the slider and the light source unit to each other. This is because a deterioration in accuracy of alignment leads to a decrease in the heating efficiency of the magnetic recording medium, which may become a big problem when performing thermally assisted magnetic recording.

It is therefore an object of the present invention to provide a thermally assisted magnetic head, a head gimbal assembly, and a hard disk drive, which can realize high-density writing onto magnetic recording media by adjusting the alignment between a light source and an optical waveguide with a very high accuracy.

The thermally assisted magnetic head in accordance with the present invention includes a magnetic head part having a medium-opposing surface opposing a magnetic recording medium and a back face opposing the medium-opposing surface; wherein the magnetic head part comprises an electromagnetic transducer, a first optical waveguide extending along the opposing direction of the medium-opposing surface and back face, and first, second, third, and fourth light shields positioned between the medium-opposing surface and back face and adapted to prevent light from passing between the medium-opposing surface and back face; wherein the first optical waveguide and the first and second light shields are arranged on a first line when seen from the medium-opposing surface or back face; wherein the first line is positioned between the third and fourth light shields when seen from the medium-opposing surface or back face; and wherein the third and fourth light shields are arranged on a second line substantially orthogonal to the first line when seen from the medium-opposing surface or back face.

In the thermally assisted magnetic head in accordance with the present invention, the first optical waveguide and the first and second light shields are arranged on the first line when seen from the medium-opposing surface or back face. In the thermally assisted magnetic head in accordance with the present invention, when seen from the medium-opposing surface or back face, the third and fourth light shields oppose each other while interposing the first line therebetween and are arranged on the second line substantially orthogonal to the first line. Therefore, a light source is initially arranged on the back face side and successively moved (scanned) while emitting light so that the emitted light irradiates the third light shield and then the fourth light shield, and how the intensity of light transmitted through the magnetic head part or the like changes is detected on the medium-opposing surface side, whereby a position between the third and fourth light shields can be specified. Subsequently, while emitting light, the light source is successively moved (scanned) along a line which passes the specified position between the third and fourth light shields and is substantially orthogonal to the second line, i.e., along the first line, and how the intensity of light transmitted through the magnetic head part or the like changes is detected on the medium-opposing surface side, whereby the position of the first optical waveguide can be specified. Hence, the position of the first optical waveguide can be specified from two different directions, whereby the alignment between the light source and the first optical waveguide can be adjusted with a very high accuracy. This can realize high-density writing onto recording media.

Preferably, the first optical waveguide is positioned between the first and second light shields when seen from the medium-opposing surface or back face. In this case, when the light source is successively moved (scanned) along the first line while emitting light, and the intensity of light transmitted through the magnetic head part or the like changes is detected on the medium-opposing surface side, the emitted light successively irradiates the first light shield, first optical waveguide, and second light shield, so that the detected amount such as light intensity successively becomes small, large, and small, whereby the position of the first optical waveguide can be specified easily with a higher accuracy.

Preferably, each of the third and fourth light shields extends in a direction along the first line when seen from the medium-opposing surface or back face. This makes it possible to specify a position between the third and fourth light shields even when the light source is moved roughly to some extent, whereby the position of the first optical waveguide can be specified more easily.

Preferably, the first, second, third, and fourth light shields are exposed at the back face. This allows each light shield to securely block the light emitted from the light source, since the light has such a property as to expand in a direction intersecting its advancing direction while advancing. As a result, the position of the first optical waveguide can be specified with a higher accuracy.

Preferably, the magnetic head part further comprises a second optical waveguide extending along the opposing direction of the medium-opposing surface and back face, while the second optical waveguide is positioned between the third and fourth light shields when seen from the medium-opposing surface or back face.

The head gimbal assembly in accordance with the present invention comprises the thermally assisted magnetic head in accordance with the present invention and a suspension for supporting the thermally assisted magnetic head.

The hard disk in accordance with the present invention comprises the head gimbal assembly in accordance with the present invention and a magnetic recording medium opposing the medium-opposing surface. The present invention can provide a thermally assisted magnetic head, a head gimbal assembly, and a hard disk drive, which can realize high-density writing onto magnetic recording media by adjusting the position of a light source with a very high accuracy.

The present invention will be more fully understood from the detailed description given here in below and the accompanying drawings which are given by way of illustration only, and thus are not to be considered as limiting the present invention.

DESCRIPTION OF THE PREFERRED EMBODIMENTS

Figure 1:
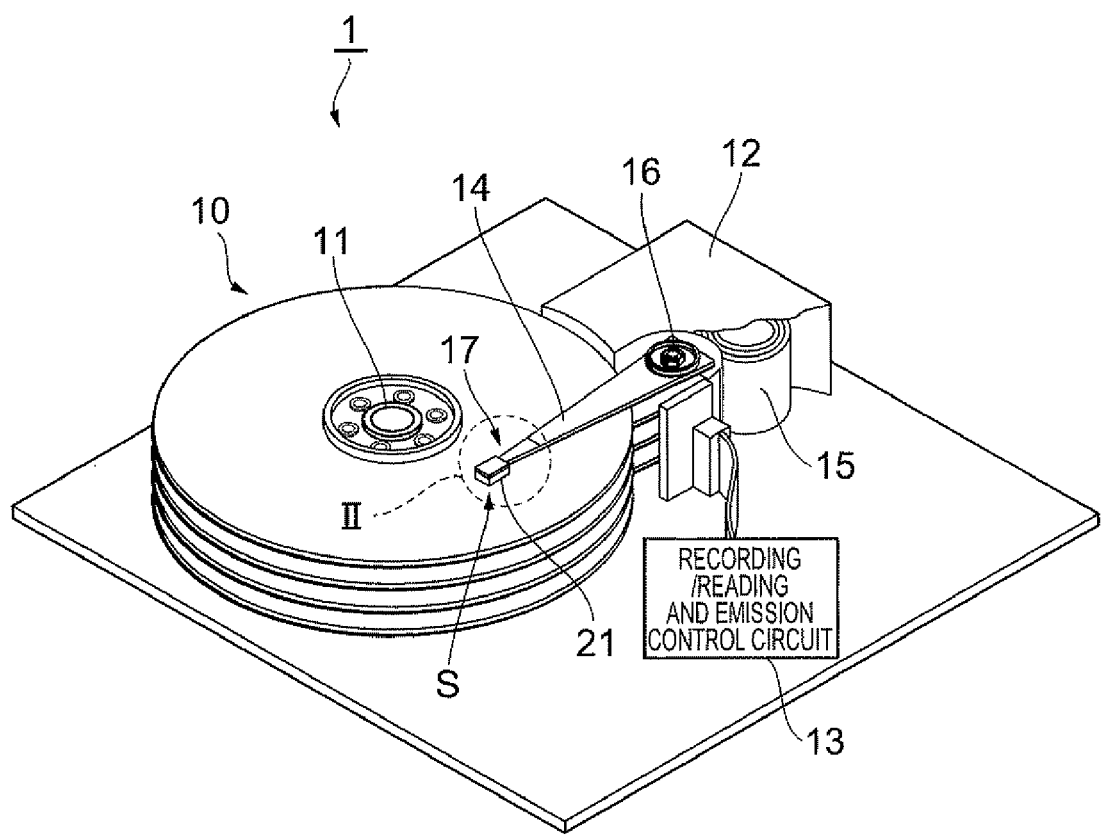
FIG. 1 is a perspective view showing a hard disk drive.

Preferred embodiments of the present invention will be explained with reference to the drawings. In the explanation, the same constituents or those having the same functions will be referred to with the same numerals or letters while omitting their overlapping descriptions. For easier viewing of the drawings, ratios of dimensions within and among the constituents in the drawings are arbitrary.

[1] Structure of Hard Disk Drive

First, with reference to FIG. 1, the structure of a hard disk drive 1 will be explained. The hard disk drive 1 comprises a plurality of magnetic disks (magnetic recording media) 10 rotating about a rotary shaft of a spindle motor 11, an assembly carriage apparatus 12 for positioning thermally assisted magnetic heads 21 onto tracks, and a recording, reading, and emission control circuit 13 for controlling writing and reading actions by the thermally assisted magnetic heads 21 and regulating a laser diode 40 which is a light source for emitting laser light for thermally assisted magnetic recording.

The assembly carriage apparatus 12 is provided with a plurality of driving arms 14. These driving arms 14 can be swung about a pivot bearing shaft 16 by a voice coil motor (VCM) 15, and are laminated in a direction along the pivot bearing shaft 16. A head gimbal assembly (HGA) 17 is attached to a leading end part of each driving arm 14. Each HGA 17 is provided with the thermally assisted magnetic head 21 opposing the front face of its corresponding magnetic disk 10. In the thermally assisted magnetic head 21, the surface opposing the front face of the magnetic disk 10 is the medium-opposing surface (also known as air bearing surface or ABS) S. The magnetic disk 10, driving arm 14, HGA 17, and thermally assisted magnetic head 21 may be provided singly as well.

[2] Structure of Head Gimbal Assembly

Figure 2:
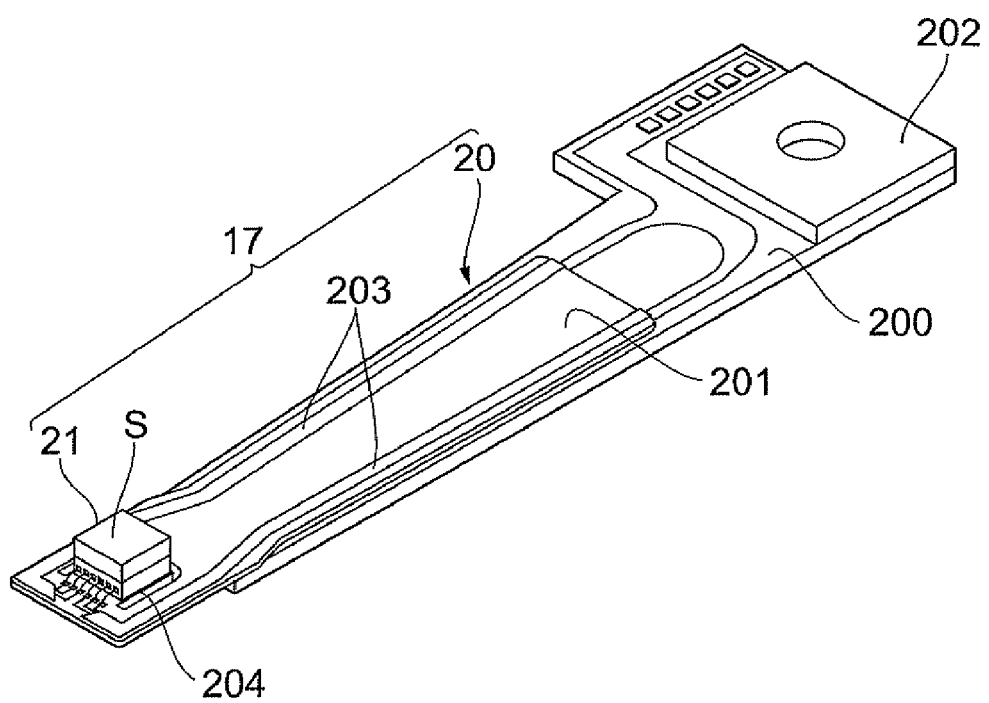
FIG. 2 is a perspective view of a head gimbal assembly showing a thermally assisted magnetic head in a state where its medium-opposing surface faces up.

The structure of the HGA 17 will now be explained with reference to FIG. 2. The HGA 17 is constructed by firmly attaching the thermally assisted magnetic head 21 to a leading end part of a suspension 20. The suspension 20 is mainly constituted by a load beam 200, an elastic flexure 201 firmly attached onto and supported by the load beam 200, a base plate 202 provided at a base part of the load beam 200, a wiring member 203 which is formed on the flexure 201 and comprises lead conductors and connecting pads electrically connected to both ends of the lead conductors, and a tongue 204 formed like a leaf spring at the leading end of the flexure 201. The suspension 20 in the HGA 17 is not limited to the structure mentioned above. Though not depicted, an IC chip for driving the head may be mounted somewhere in the suspension 20.

[3] Structure of Thermally Assisted Magnetic Head

The structure of the thermally assisted magnetic head 21 will now be explained with reference to FIGS. 3 to 7. The thermally assisted magnetic head 21 comprises a slider 22 having a slider substrate 220 and a magnetic head part 32 for writing and reading data, and a light source unit 23 having a light source supporting substrate 230 and a laser diode (light-emitting device) 40 acting as a light source for thermally assisted magnetic recording. The slider substrate 220 and the light source supporting substrate 230 are firmly attached to each other by an adhesive 44 such as UV-curable epoxy resin or UV curable acrylic resin in a state where a back face 2201 of the slider substrate 220 and a bonding surface 2300 of the light source supporting substrate 230 are in contact with each other (see FIG. 4).

Here, the back face 2201 of the slider substrate 220 is a surface positioned on the opposite side of the slider 22 from the medium-opposing surface S. The bottom face 2301 of the light source supporting substrate 230 is firmly attached to the tongue 204 of the flexure 201 by an adhesive such as epoxy resin.

[3.1] Slider

Figure 3:
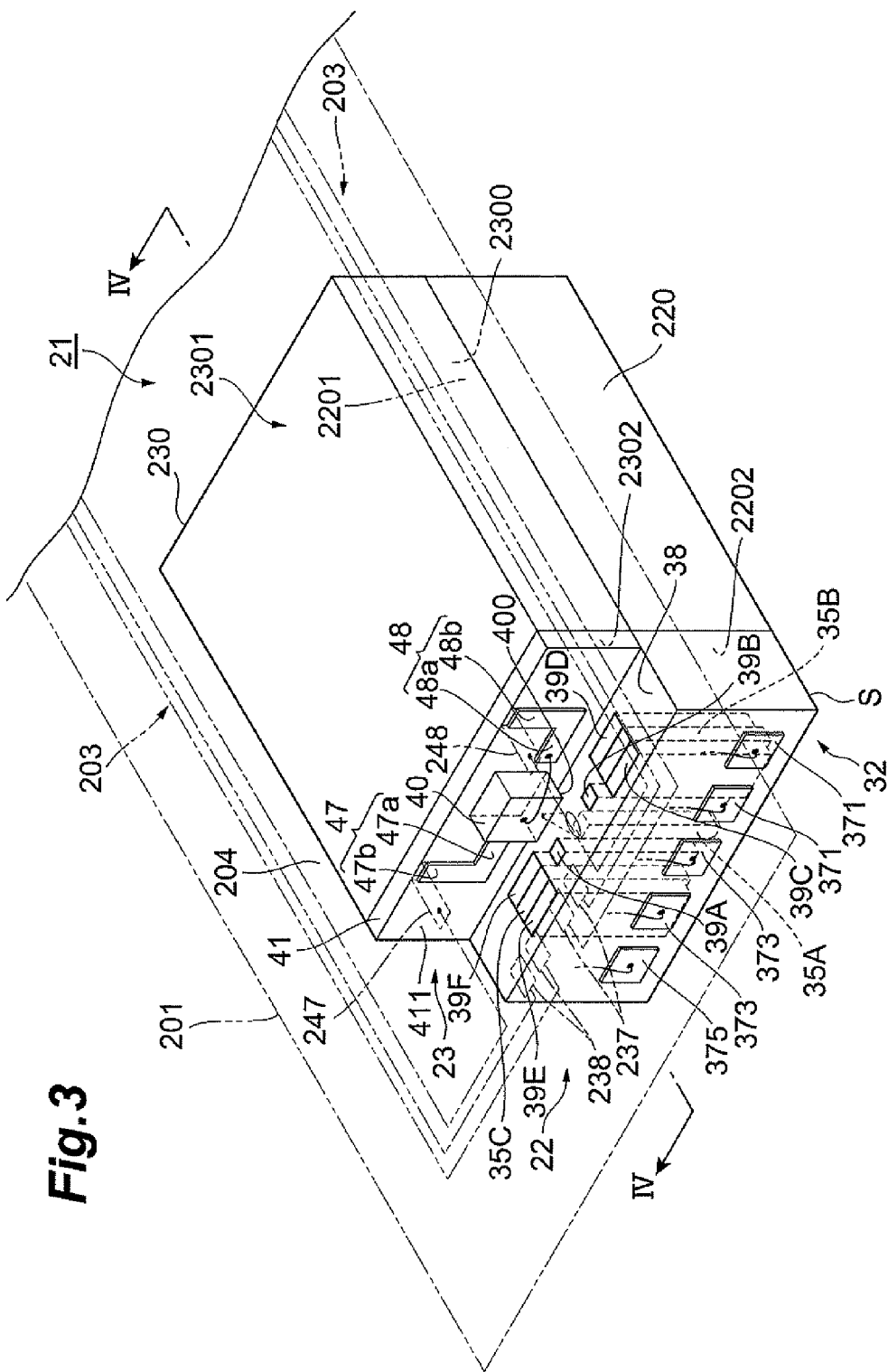
FIG. 3 is a perspective view showing the thermally assisted magnetic head.

The slider substrate 220 in the slider 22 has a planar form as shown in FIG. 3. The medium-opposing surface S of the slider substrate 220 is processed into a predetermined form such that the thermally assisted magnetic head 21 can attain an appropriate flying height. The slider substrate 220 can be formed by AlTiC ($Al_2O_3 \cdot TiC$) or the like which is conductive.

Figure 4:
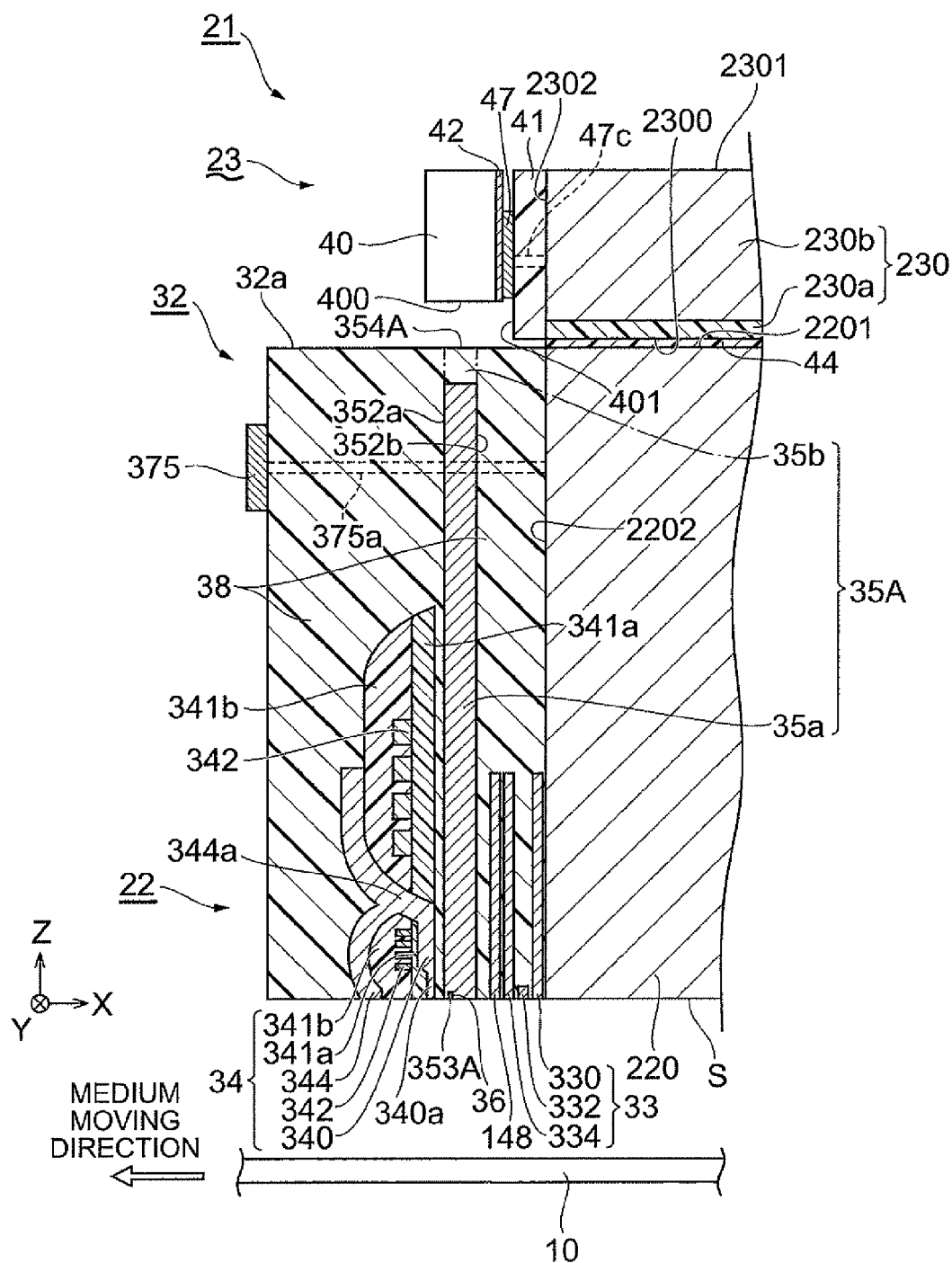
FIG. 4 is a sectional view taken along the line IV-IV of FIG. 3.

The magnetic head part 32 in the slider 22 is provided on an integration surface 2202 which is a side face adjacent to the medium-opposing surface S and back face 2201 and substantially perpendicular to the medium-opposing surface S of the slider substrate 220. The magnetic head part 32 comprises a reading head part 33 having an M device 332, a recording head part 34 as an inductive electromagnetic transducer for writing, optical waveguides 35A, 35B, 35C provided between the reading head part 33 and recording head part 34, a near-field-light-generating part (plasmon probe) 36 for generating near-field light for heating a recording layer part of the magnetic disk 10, light shields 39A, 39B, 39C, 39D, 39E, 39F, and an insulating layer 38 formed on the integration surface so as to cover the reading head part 33, recording head part 34, optical waveguides 35A to 35C, near-field-light-generating part 36, and light shields 39A to 39F. As shown in FIG. 4, the reading head part 33 is constructed by laminating a lower magnetic shield layer 330 also acting as a lower electrode, an MR device 332, and an upper magnetic shield layer 334 also acting as an upper electrode in this order on the slider substrate 220. A pair of bias application layers IM made of a hard magnetic material (see FIG. 6) is formed on both sides in the track width direction of the MR device 332 by way of the insulating layer 38.

The lower and upper magnetic shield layers 330, 334 are made of a soft magnetic material such as NiFe, CoFeNi, CoFe, FeN, or FeZrN and prevent the MR device 332 from sensing unnecessary external magnetic fields. The lower and upper magnetic shield layers 330, 334 can be formed by pattern plating such as frame plating by a thickness of about 0.5 µm to 3 µm each, for example.

The MR device 332 has a multilayer structure including a free layer (not depicted) and is arranged on the medium-opposing surface S side so as to be exposed at the medium-opposing surface S. Utilizing a magnetoresistive effect, the MR device 332 detects a change in a magnetic field inputted from the magnetic disk 10, thereby reading magnetic information recorded on the magnetic disk 10. GMR (giant magnetoresistive) devices utilizing a giant magnetoresistive effect yielding a high magnetoresistance change ratio, AMR (anisotropic magnetoresistive) devices utilizing an anisotropic magnetoresistive effect, TMR (tunneling magnetoresistive) devices utilizing a magnetoresistive effect occurring at a tunneling junction, CPP (Current Perpendicular to Plane)-GMR devices, and the like may be used in place of the M device 332.

The recording head part 34 has a main magnetic pole layer 340, a gap layer 341a, a thin-film coil insulating layer 341b, a thin-film coil 342, and an auxiliary magnetic pole layer 344. The main magnetic pole layer 340 is a magnetic waveguide by which a magnetic flux induced by the thin-film coil 342 is guided to the recording layer of the magnetic disk 10 to be recorded while being converged, and extends from the spiral center of the thin-film coil 342 to the medium-opposing surface S. The main magnetic pole layer 340 includes a magnetic pole end part 340a which is positioned on the medium-opposing surface S side and exposed at the medium-opposing surface S. When the thin-film coil 342 is energized, a magnetic field is guided to the magnetic pole end part 340a of the main magnetic pole layer 340, whereby its leading end generates a writing magnetic field.

Preferably, the magnetic pole end part 340a is made smaller than the other parts in terms of the width in the track width direction and the thickness in the laminating direction (horizontal direction in FIG. 4). As a result, a fine, strong writing magnetic field adapted to higher recording density can be generated. Specifically, it will be preferred if the leading end of the magnetic pole end part 340a is tapered such as to form an inverted trapezoid in which a side on the leading side, i.e., the slider substrate 220 side, is shorter than a side on the trailing side. Namely, each of the end faces of the magnetic pole end part 340a is provided with a bevel angle θ so as not to cause unnecessary writing and the like in adjacent tracks under the influence of skew angles generated when driven by a rotary actuator. The bevel angle θ is about 15°, for example. The writing magnetic field is mainly generated near the longer side on the trailing side, while the length of the longer side determines the width of a writing track in the case of magnetic dominant recording.

Here, the main magnetic pole layer 340 is preferably constituted by an alloy made of two or three elements among Ni, Fe, and Co, an alloy manly composed of them and doped with a predetermined element, or the like. The main magnetic pole layer 340 can be formed by frame plating, sputtering, or the like. The thickness of the magnetic pole end part 340a can be set to about 0.01 µm to 0.5 µm, for example, while the thickness of the main magnetic pole layer 340 in the part other than the magnetic pole end part 340a can be set to about 0.5 µm to 3.0 µm, for example. The track width can be set to about 100 nm, for example.

The auxiliary magnetic pole layer 344 is magnetically connected to the main magnetic pole layer 340 at an end part 344a on the side remote from the medium-opposing surface S. The end part of the auxiliary magnetic pole layer 344 on the medium-opposing surface S side forms a trailing shield part having a layer cross section wider than the other part of the auxiliary magnetic pole layer 344. The end part of the auxiliary magnetic pole layer 344 on the medium-opposing surface S side is exposed at the medium-opposing surface S. Since the gap layer 341a and thin-film coil insulating layer 341b are interposed between the main magnetic pole layer 340 and auxiliary magnetic pole layer 344, the end part of the auxiliary magnetic pole layer 344 on the medium-opposing surface S side opposes the magnetic pole end part 340a of the main magnetic pole layer 340 with a predetermined gap therebetween.

The auxiliary magnetic pole layer 344 is preferably constituted by an alloy made of two or three elements among Ni, Fe, and Co, an alloy mainly composed of them and doped with a predetermined element, or the like. The auxiliary magnetic pole layer 344 can be formed by frame plating, sputtering, or the like. The thickness of the auxiliary magnetic pole layer 344 can be set to about 0.5 µm to 5 µm, for example.

For electrically insulating the main magnetic pole layer 340 and thin-film coil 342 from each other, the gap layer 341a is constituted by $Al_2O_3$, AlN, or the like and can be formed by sputtering, CVD, or the like. The thickness of the gap layer 341a can be set to about 0.01 µm to 0.5 µm, for example.

For electrically insulating the thin-film coil 342 and auxiliary magnetic pole layer 344 from each other, the thin-film coil insulating layer 341b is constituted by alumina, a resist which is an organic insulating material, or the like. The thickness of the thin-film coil insulating layer 341b can be set to about 0.1 µm to 5 µm, for example.

The thin-film coil 342 is constructed like a spiral in which a lead is wound about the end part 344a of the auxiliary magnetic pole layer 344. The thin-film coil 342 can be constituted by Cu or the like. The thickness of the thin-film coil 342 can be set to about 0.5 µm to 3 µm, for example.

As shown in FIG. 4, the optical waveguide 35A is arranged between the reading head part 33 and recording head part 34, and extends from the medium-opposing surface S to the back face 32a (the surface of the magnetic head part 32 on the side opposite from the medium-opposing surface S) so as to become parallel to the integration surface 2202. As shown in FIG. 4, the optical waveguide 35A is constituted by a core part 35a extending from the medium-opposing surface S to the vicinity of the back face 32a, and a noncore part 35b extending from the end face of the core part 35a on the medium-opposing surface S side to the back face 32a. Therefore, the end face of the core part 35a on the medium-opposing surface S side (the end face of the optical waveguide 35A on the medium-opposing surface S side) is exposed at the medium-opposing surface S and forms a light exit surface 353A from which laser light generated by the laser diode 40 is emitted (see FIGS. 4 and 6).

Figure 6:
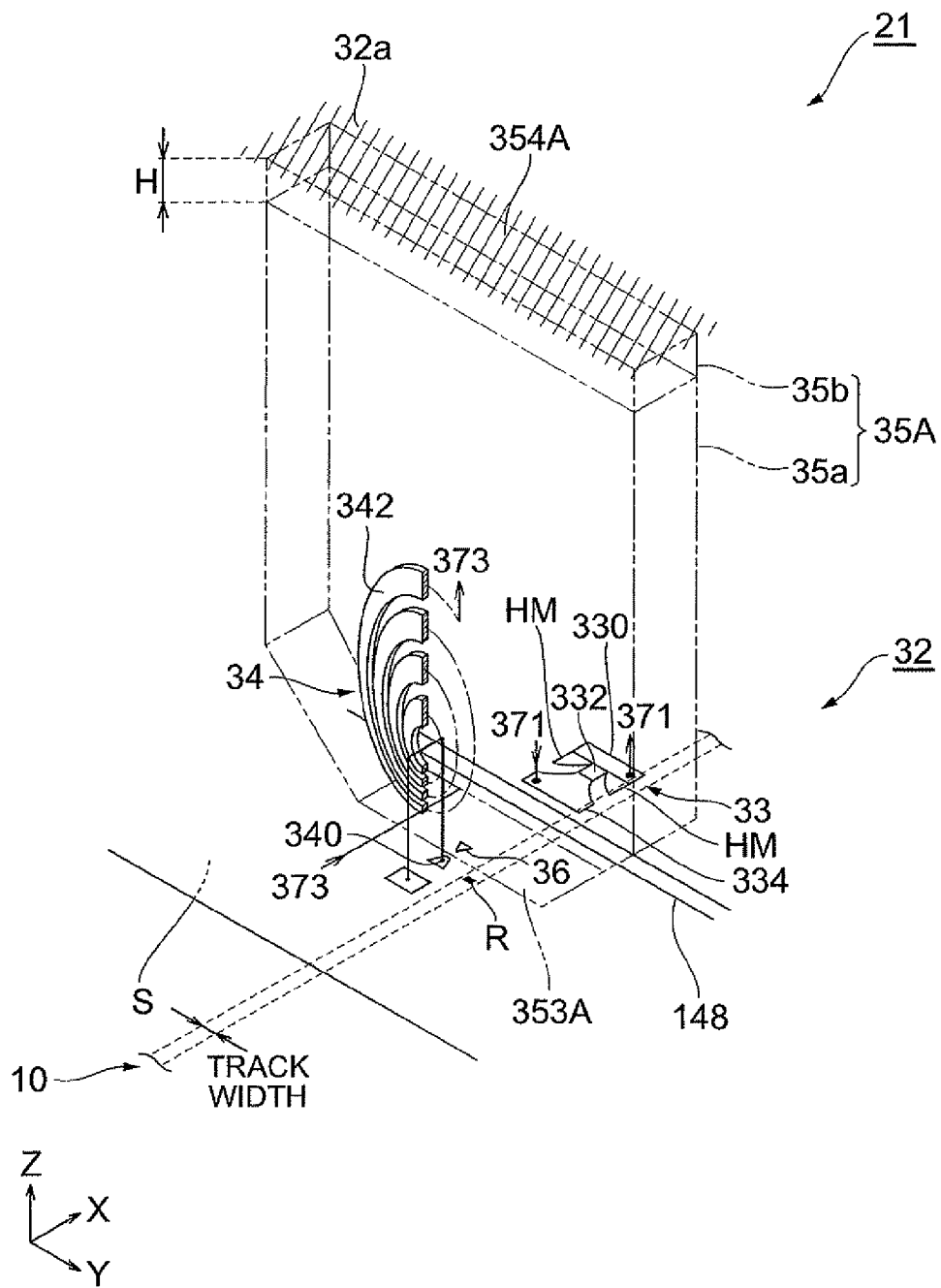
FIG. 6 is a perspective view showing a main part of the thermally assisted magnetic head.

The end face of the noncore part 35b on the back face 32a side (the end face of the optical waveguide 35A on the side opposite from the light exit surface 353A) is exposed at the back face 32a and forms a light entrance surface 354A on which the laser light generated by the laser diode 40 is incident (see FIGS. 4 and 6). Though the end face of the core part 35a on the back face 32a side is not exposed at the back face 32a, the laser light from the laser diode 40 propagates through the noncore part 35b (between the back face 32a and the end face of the core part 35a on the back face 32a side) and the core part 35a, before being emitted from the light exit surface 353A.

As shown in FIG. 6, the core part 35a is mainly formed like a substantially rectangular plate, while both corner portions in the track width direction of its end part on the medium-opposing surface S side are chamfered. Therefore, the end part of the core part 35a on the medium-opposing surface S side reduces its width in the track width direction toward the medium-opposing surface S. This makes it possible for the core part 35a (optical waveguide 35A) to converge the laser light from the laser diode 40 at the center part in the track width direction. Here, the back face 32a is substantially parallel to the medium-opposing surface S.

Returning to FIG. 4, the core part 35a is covered with the insulating layer 38 except for the light exit surface 353A. The insulating layer 38 is constituted by a material having a refractive index lower than that of the material constituting the core part 35a, so as to function as a cladding for the core part 35a. Namely, a part of the insulating layer 38 forms the noncore part 35b. Preferably, the noncore part 35b has a length H (see FIG. 6) set to about 0.5 µm to 20 Jim in the dept direction with respect to the medium-opposing surface S.

When the insulating layer 38 as a cladding is formed by $SiO_2$ (n =1.5), the core part 35a can be formed by $Al_2O_3$ (n=1.63). When the insulating layer 38 is formed by $Al_2O_3$, the core part 35a can be formed by $Ta_2O_5$ (n=2.16), $Nb_2O_5$ (n=2.33), TiO (n=23 to 2.55), or $TiO_2$ (n =2.3 to 2.55). When the core part 35a is constituted by such a material, the propagation loss of laser light is reduced not only by favorable optical characteristics inherent in the material but also by the fact that the total reflection condition is attained at the interface.

As shown in FIGS. 4 and 6, an interdevice shield layer 148 formed by a material similar to that of the lower and upper shield layers 330 and 334 is arranged between the reading head part 33 and optical waveguide 35A. The interdevice shield layer 148 blocks the magnetic field generated in the recording head part 34 so as to keep the M device 332 from sensing it, thereby functioning to suppress exogenous noise at the time of reading by the MR device 332. A backing coil part may further be formed between the reading head part 33 and optical waveguide 35A.

Figure 5:
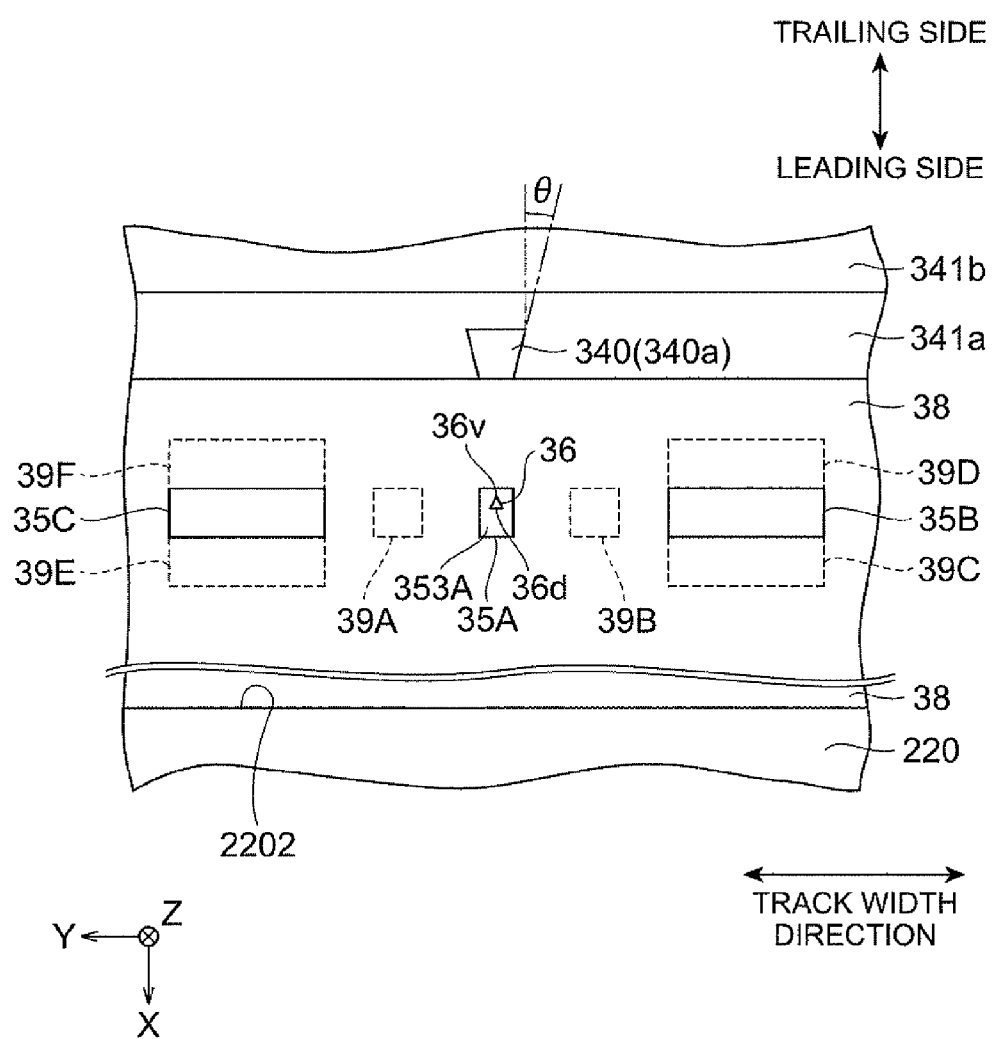
FIG. 5 is a partly enlarged view of a magnetic pole end part and optical waveguides as seen from the medium-opposing surface side.

As shown in FIGS. 4 to 6, the near-field-light-generating part 36 is a planar member arranged at the light exit surface 353A of the optical waveguide 35. The near-field-light-generating part 36 is positioned at a location where laser light having a high intensity is emitted in the light exit surface 353A, and buried in the core part 35a such as to expose its end face at the light exit surface 353A.

As shown in FIGS. 5 and 6, the near-field-light-generating part 36 exhibits a triangular form when seen from the medium-opposing surface S, and is constituted by a conductive material (e.g., Au, Ag, Al, Cu, Pd, Pt, Rn, or Ir or an alloy combining such elements). A base 36d of the near-field-light-generating part 36 is arranged parallel to the integration surface 2202 of the slider substrate 220, i.e., parallel to the track width direction, while a vertex 36v of the near-field-light-generating part 36 opposing the base 36d is arranged closer to the main magnetic pole layer 340 than is the base 36d. The form of the near-field-light-generating part 36 is preferably an isosceles triangle in which two base angles at both ends of the base 36d are equal.

When thus configured near-field-light-generating part 36 is irradiated with the laser light from the laser diode 40, electrons in the metal constituting the near-field-light-generating part 36 are subjected to plasma oscillations, so that electric fields are converged near the vertex 36v, whereby near-field light is generated so as to be directed from near the vertex 36v to a recording area R of the magnetic disk 10 (see FIG. 6). The spread of near-field light is about the radius of the near-field-light-generating part 36 in the vicinity of the vertex 36v, whereby the emitted light can simulatively be narrowed to a diffraction limit or less if the radius near the vertex 36v is not greater than the track width.

Figure 7:
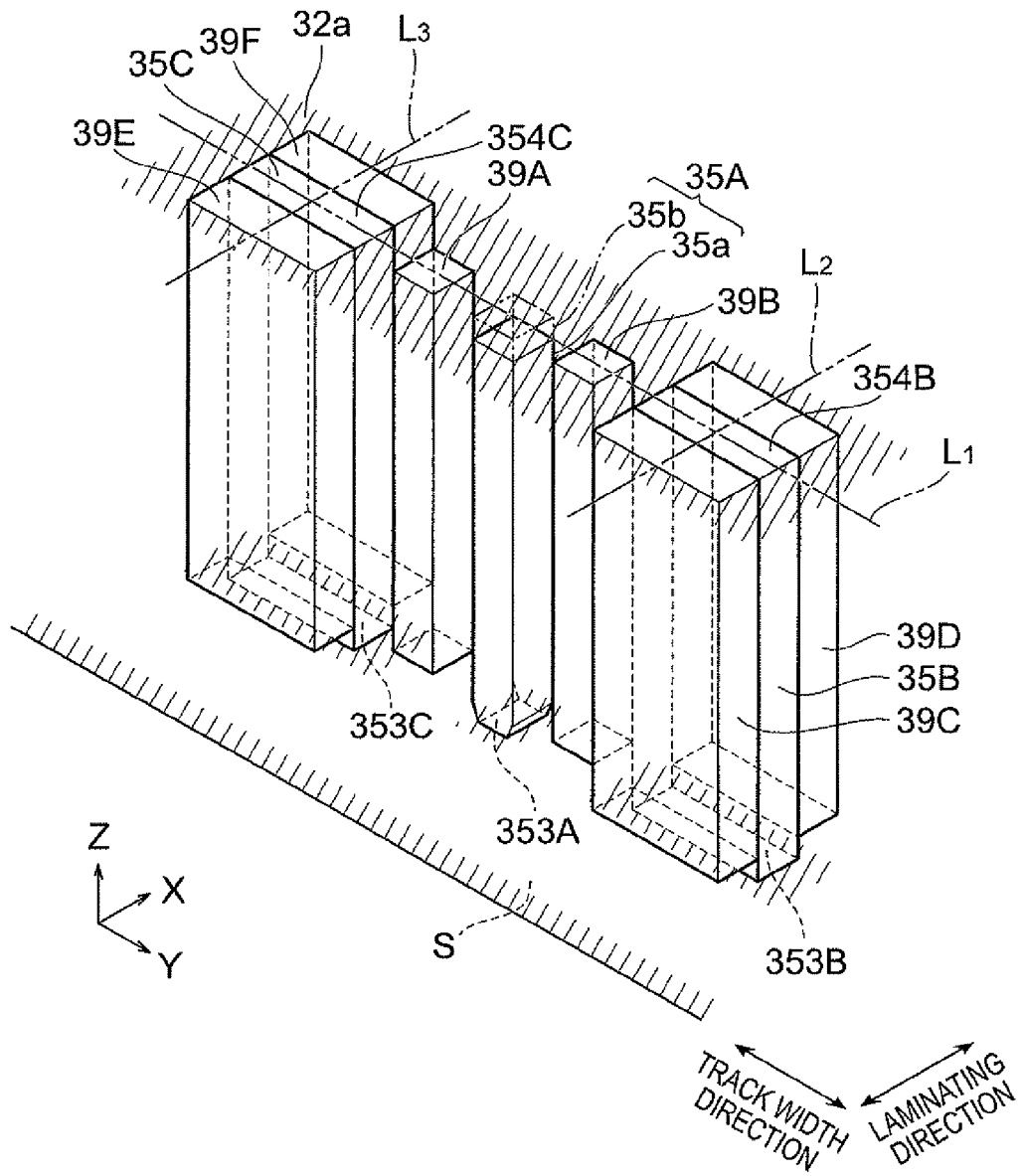
FIG. 7 is a perspective view mainly showing optical waveguides and light shields.

On the other hand, as shown in FIGS. 3 and 7, the optical waveguides 35B, 35C are arranged so as to oppose each other while interposing the optical waveguide 35A therebetween in the track width direction when seen from the back face 32a (or the medium-opposing surface S), and extend from the medium-opposing surface S to the back face 32a so as to become parallel to the integration surface 2202. The optical waveguides 35B, 35C are totally constituted by the same material as that of the core part 35a of the optical waveguide 35A. Hence, the end faces of the optical waveguides 35B, 35C on the medium-opposing surface S side are exposed at the medium-opposing surface S, and form light exit surfaces 353B, 353C from which light generated by a light source positioned on the back face 32a is emitted (see FIG. 7).

The end faces of the optical waveguides 35B, 35C on the back face 32a side are exposed at the back face 32a, and form light entrance surfaces 354B, 354C on which the light generated by the light source positioned on the back face 32a is incident (see FIG. 7). Unlike the optical waveguide 35A, the optical waveguides 35B, 35C are not provided with the near-field-light-generating part 36.

Except for the light exit surfaces 353B, 353C and light entrance surfaces 354B, 354C, the optical waveguides 35B, 35C are covered with the insulating layer 38 (see FIG. 3). Therefore, the insulating layer 38 also functions as a cladding for the light entrance surfaces 354B, 354C.

The light shields 39A to 39F reflect, absorb, or scatter light, for example, so as to prevent the light from passing between the medium-opposing surface S and back face 32a (block the light). The light shields 39A to 39F are constituted by a metal material such as Cu, Ni, Fe, or Au or a magnetic material such as permalloy, for example, and can be formed by plating, for example.

As shown in FIGS. 3 and 7, the light shields 39A to 39F extend from the medium-opposing surface S to the back face 32a so as to become parallel to the integration surface 2202 (i.e., are positioned between the medium-opposing surface S and back face 32a). The end faces of the light shields 39A to 39F on the back face 32a side are exposed at the back face 32a, while the end faces of the light shields 39A to 39F on the medium-opposing surface S side are not exposed at the medium-opposing surface S.

When seen from the back face 32a (or the medium-opposing surface S), the light shields 39A, 39B are arranged between the optical waveguides 35B, 35C so as to oppose each other while interposing the optical waveguide 35A therebetween in the track width direction. When seen from the back face 32a (or the medium-opposing surface S), the light shields 39C, 39D are arranged so as to oppose each other while interposing the optical waveguide 35B therebetween. When seen from the back face 32a (or the medium-opposing surface S), the light shields 39E, 39F are arranged so as to oppose each other while interposing the optical waveguide 35C therebetween.

Therefore, when seen from the back face 32a (or the medium-opposing surface S), the optical waveguides 35A, 35B, 35C and light shields 39A, 39B are arranged on the same line (on a first line $L_1$) (see FIG. 7). When seen from the back face 32a (or the medium-opposing surface S), the optical waveguide 35B and light shields 39C, 39D are arranged on a second line $L_2$ substantially orthogonal to the first line $L_1$ (the line on which the optical waveguides 35A, 35B, 35C and light shields 39A, 39B are arranged) (see FIG. 7). When seen from the back face 32a (or the medium-opposing surface S), the optical waveguide 35C and light shields 39E, 39F are arranged on a third line $L_3$ substantially orthogonal to the first line $L_1$ (the line on which the optical waveguides 35A, 35B, 35C and light shields 39A, 39B are arranged) (see FIG. 7). The light shields 39C to 39F and optical waveguides 35B, 35C extend in directions along the first line $L_1$.

Returning to FIG. 3, the magnetic head part 32 in the slider 22 further comprises a pair of electrode pads 371 (see also FIG. 6) connected to input and output terminals of the reading head part 33, respectively, for signal terminals; a pair of electrode pads 373 (see also FIG. 6) connected to both ends of the recording head part 34, respectively, for signal terminals; and a grounding electrode pad 375 (see also FIG. 4) electrically connected to the slider substrate 220 through a via hole 375a. The electrode pads 371, 373, 375 are formed on the exposed surface of the insulating layer 38. The electrode pad 375 is connected to the electrode pad 274 of the flexure 201 by a bonding wire (not depicted). Therefore, the potential of the slider substrate 220 is adjusted by the electrode pad 274 to the ground potential, for example.

[3.2] Light Source Unit

As shown in FIG. 3, the light source supporting substrate 230 in the light source unit 23 exhibits a planar form. As shown in FIG. 4, the light source supporting substrate 230 has a heat insulating layer 230a formed by alumina or the like and a conductor layer 230b formed by AlTiC ($Al_2O_3 \cdot TiC$) or the like which is conductive. The heat insulating layer 230a is bonded to the back face 2201 of the slider substrate 220 and acts as the bonding surface 2300 of the light source supporting substrate 230. An insulating layer 41 formed by an insulating material such as alumina is provided on a device forming surface 2303 which is a side face adjacent to the bonding surface 2300.

Electrode pads 47, 48 for driving the laser diode 40 are formed on a surface 411 (parallel to the integration surface 2202 of the slider substrate 220) which is a surface of the insulating layer 41 and intersects the medium-opposing surface S (see FIG. 3). The electrode pad 47 has a first part 47a extending in the track width direction in the center part of the surface 411 of the insulating layer 41 and a second part 47b extending from the end part of the first part 47a to the bottom face 2301 of the light source supporting substrate 230. On the other hand, the electrode pad 48 is formed at a position separated from the electrode pad 47 on the surface 411 of the insulating layer 41, and has a first part 48a extending in the track width direction in the center part of the surface 411 of the insulating layer 41 and a second part 48b extending from the end part of the first part 48a to the bottom face 2301 of the light source supporting substrate 230. The electrode pads 47, 48 are electrically connected to the electrode pads 247, 248 of the flexure 201, respectively, by reflow soldering.

As shown in FIG. 4, the electrode pad 47 is electrically connected to the conductor layer 230b of the light source supporting substrate 230 by a via hole 47c provided within the insulating layer 41. Therefore, the potential of the conductor layer 230b can be adjusted by the electrode pad 47 to the ground potential, for example. Together with the via hole 47c, the electrode pad 47 also functions as a heat conduction path for transferring the heat generated at the time of driving the laser diode 40 toward the conductor layer 230b.

Each of the electrode pads 47, 48 can be constituted, for example, by a foundation layer formed by Ta, Ti, or the like and a layer formed on the foundation layer by vacuum vapor deposition, sputtering, or the like with Au, Cu, or the like. The thickness of the foundation layer made of Ta, Ti, or the like can be set to about 10 nm, for example, while the thickness of the layer made of Au, Cu, or the like can be set to about 1 μm to 3 μm, for example.

As shown in FIG. 4, the laser diode 40 in the light source unit 23 is firmly attached onto the electrode pad 47 by a solder layer 42 made of a conductive solder material such as Au—Sn, so as to be electrically connected to the electrode pad 47. Namely, a part of the electrode pad 47 is covered with the laser diode 40, while the laser diode 40 is supported by the light source supporting substrate 230 through the electrode pad 47. More specifically, the laser diode 40 is supported by the light source supporting substrate 230 such that the laser light emitted from a light exit end 400, which will be explained later, is introduced to the optical waveguide 35A (see FIGS. 3 and 4).

The laser diode 40 is also supported by the light source supporting substrate 230 such that the light exit end 400 is located closer to the magnetic head part 32 than is the back face 2201 of the slider substrate 220 (see FIGS. 3 and 4). The laser diode 40 can be supported as such, since the back face 2201 of the slider substrate 220 projects more outward than the back face 32a of the magnetic head part 32 does as mentioned above. This inhibits the laser light emitted from the laser diode 40 from being scattered on the light source supporting substrate 230 before reaching the optical waveguide 35A, whereby the magnetic disk 10 can be heated sufficiently.

Figure 8:
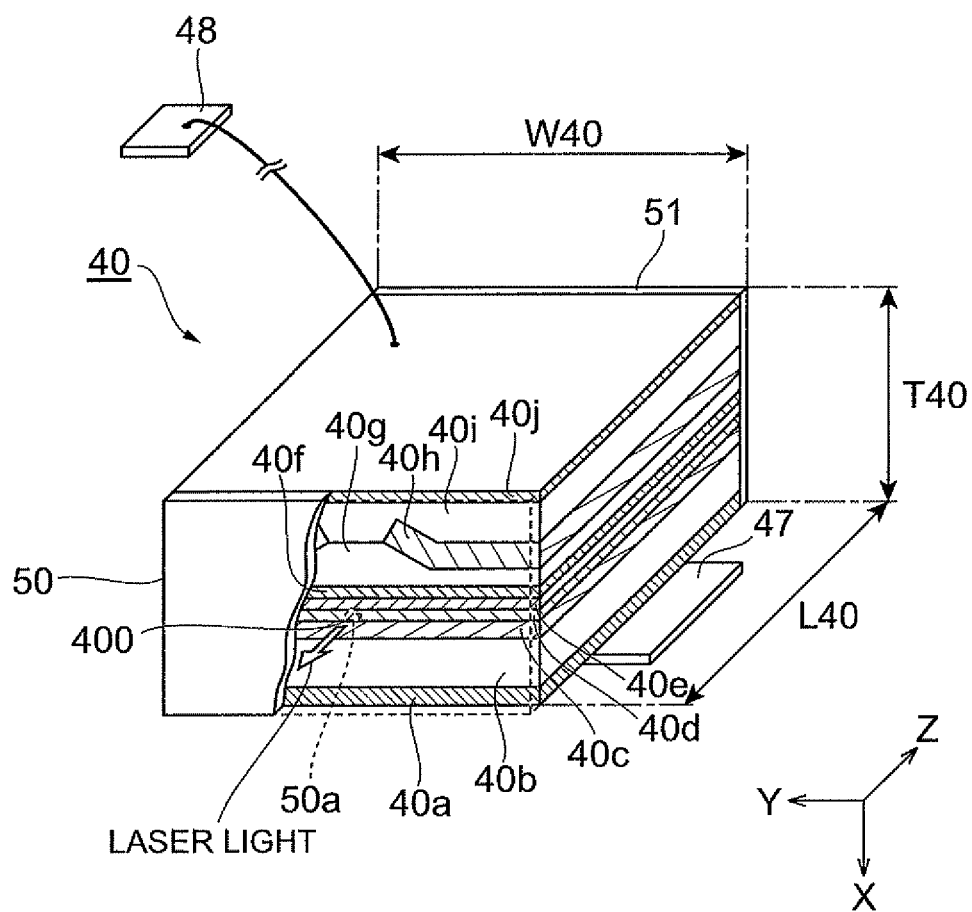
FIG. 8 is a perspective view showing a laser diode.

The laser diode 40 may have the same structure as one typically used for optical disk storage. For example, as shown in FIG. 8, the laser diode 40 has a structure in which an n-electrode 40a, an n-GaAs substrate 40b, an n-InGaAlP cladding layer 40c, a first InGaAlP guide layer 40d, an active layer 40e made of a multiple quantum well (InGaP/InGaAlP) or the like, a second InGaAlP guide layer 40f, a p-InGaAlP cladding layer 40g, an *n-GaAs current blocking layer 40h, a p-GaAs contact layer 40i, and a p-electrode 40j are successively laminated. Reflective films 50, 51 made of $SiO_2$, $Al_2O_3$, or the like for pumping oscillations by total reflection are formed in front and rear of a cleavage surface of the multilayer structure. One reflective film 50 is provided with an opening 50a at a position corresponding to the active layer 40e, while an area corresponding to the opening 50a in the surface formed with the reflecting film 50 is a light exit end 400 from which the laser light is emitted. When a voltage is applied to thus constructed laser diode 40 in the thickness direction, the laser light is emitted from the light exit end 400.

The emitted laser light has a wavelength $\lambda_L$ of about 600 nm to 650 nm, for example. However, care must be taken such that there is an appropriate pumping wavelength corresponding to the metal material of the near-field-light-generating part 36. When Au is used for the near-field-light-generating part 36, for example, the wavelength $\lambda_L$ of laser light is preferably near 600 nm.

Dimensions of the laser diode 40 can be set such as to have a width W40 of 200 μm to 350 μm, a length L40 of 250 μm to 600 μm, and a thickness T40 of 60 μm to 200 μm. Here, the width W40 of the laser diode 40 can be reduced to about 100 μm, for example, while its lower limit is the distance between the opposing ends of the current blocking layer 40h. However, the length of the laser diode 40 is related to the current density and cannot be made so small. In any case, it will be preferred if the laser diode 40 secures a considerable size taking account of handling at the time of mounting.

The laser diode 40 can also be driven by a power supply in the hard disk drive 1. In practice, the hard disk drive 1 is equipped with a power supply of about 2 V, for example, whose voltage is high enough for laser oscillations. The power consumption of the laser diode 40 is about several tens of mW and thus can sufficiently be covered by the power supply in the hard disk drive 1.

The n-electrode 40a of the laser diode 40 is secured to the electrode pad 47 by the solder layer 42 made of AuSn or the like. Here, the light exit end (light exit surface) 400 of the laser diode 40 faces down (in the —Z direction) in FIG. 4 (so as to be parallel to the bonding surface 2300), thereby opposing the light entrance surface 354A of the optical waveguide 35A. For securing the laser diode 40 in practice, for example, a vapor deposition film of an AuSn alloy having a thickness of about 0.7 μm to 1 μm is formed on the surface of the electrode pad 47, the laser diode 40 is mounted thereon, and then heating to about 200° C. to 300° C. is effected by a hot plate or the like under a hot air blower.

The p-electrode 40j of the laser diode 40 is electrically connected to the electrode pad 48 by a bonding wire. The n-electrode 40a may be electrically connected to the electrode pad 48 by a bonding wire, while the p-electrode 40j may be secured to the electrode pad 47 by the solder layer 42. The laser diode 40 may be processed into steps on the side connected to the light source supporting substrate 230, so as to be electrically connected to the electrode pad 48 with no bonding wire.

When soldering with the above-mentioned AuSn alloy, the light source unit 23 is heated to a high temperature around 300° C., for example. In the thermally assisted magnetic head 21 in accordance with this embodiment, the light source unit 23 is manufactured separately from the slider 22, whereby the magnetic head part 32 of the slider 22 is not adversely affected by the high temperature.

The structures of the laser diode 40 and electrode pads 47, 48 are not limited to those in the above-mentioned embodiment. For example, the laser diode 40 may have a different structure using other semiconductor materials such as those based on GaAlAs. Other brazing materials can be used for soldering the laser diode 40 to electrodes. The laser diode 40 may be formed by epitaxially growing a semiconductor material directly on the light source supporting substrate 230.

[4] Circuit Configuration of Thermally Assisted Magnetic Head

Figure 9:
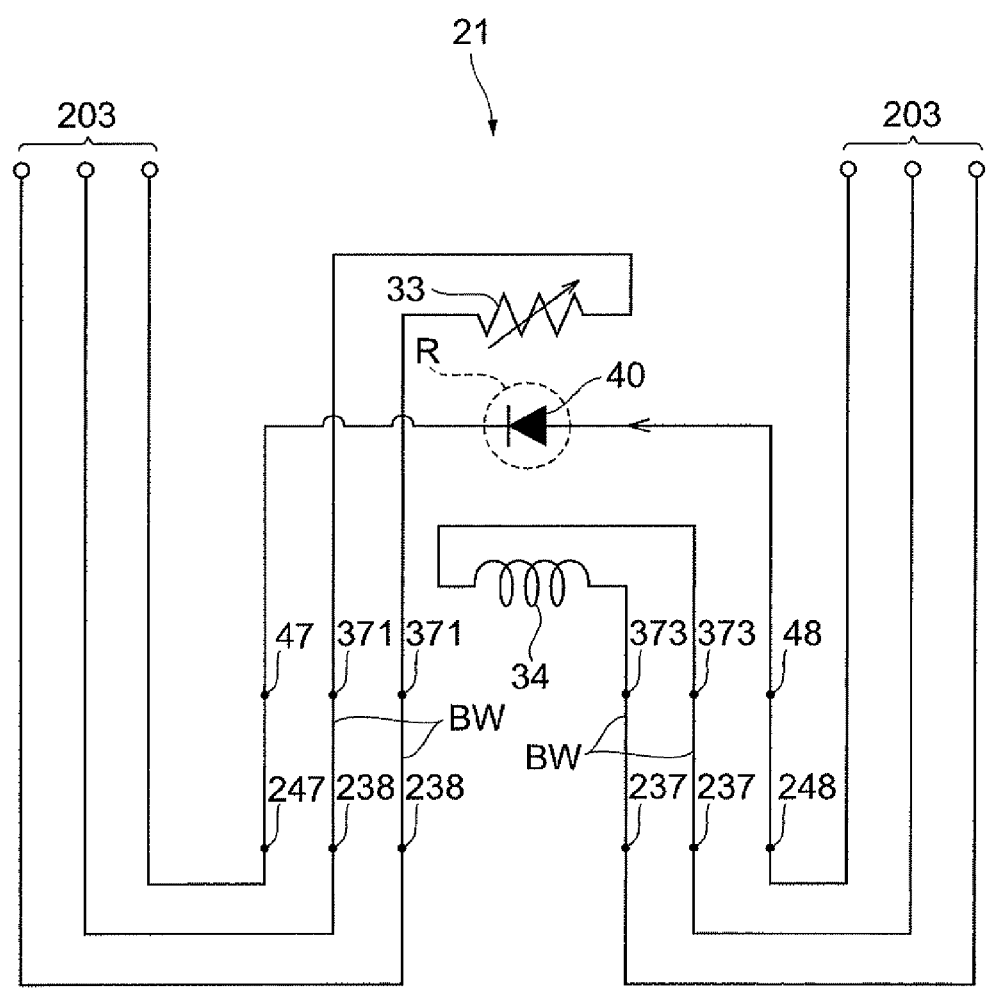
FIG. 9 is a diagram showing a circuit configuration of the thermally assisted magnetic head.

The circuit configuration of the thermally assisted magnetic head 21 will now be explained with reference to FIG. 9.

One of leads constituting the wiring member 203 is electrically connected to the cathode of the laser diode 40 through the electrode pads 247, 47, while another lead is electrically connected to the anode of the laser diode 40 through the electrode pads 248, 48. When a driving current is supplied between the electrode pads 247, 248, the laser diode 40 emits light. This light irradiates the recording area R (see FIG. 6) of the magnetic disk 10 by way of the optical waveguide 35A and medium-opposing surface S.

Another pair of leads constituting the wiring member 203 are connected to both ends of the recording head part 34 through the electrode pads 237, bonding wires BW, and electrode pads 373. When a voltage is applied between the pair of electrode pads 237, the recording head part 34 is energized, whereby a writing magnetic field occurs. In the thermally assisted magnetic head 21, the laser light emitted from the laser diode 40 is incident on the light entrance surface 354A of the optical waveguide 35A and exits from the light exit surface 353A provided on the medium-opposing surface S, so as to irradiate the recording area R (see FIG. 6) of the magnetic disk 10. Here, temperature rises in the recording area R of the magnetic disk 10 opposing the medium-opposing surface S, whereby the coercivity of the recording area R decreases temporarily. Therefore, when the recording head part 34 is energized in this coercivity decreasing period, so as to generate a writing magnetic field, information can be written in the recording area R.

Still another pair of leads constituting the wiring member 203 are connected to both ends of the reading head part 33 through the electrode pads 238, bonding wires BW, and electrode pads 371. When a voltage is applied between the pair of electrode pads 238, a sense current flows through the reading head part 33. Information written in the recording area R can be read by causing the sense current to flow through the reading head part 33.

[5] Method of Manufacturing Thermally Assisted Magnetic Head

A method of manufacturing the thermally assisted magnetic head 21 will now be explained with reference to FIGS. 10 to 13.

First, the slider 22 having the above-mentioned structure and the light source unit 23 having the above-mentioned structure are manufactured. Subsequently, the slider 22 and light source unit 23 that are considered nondefective are aligned with each other.

Figure 10:
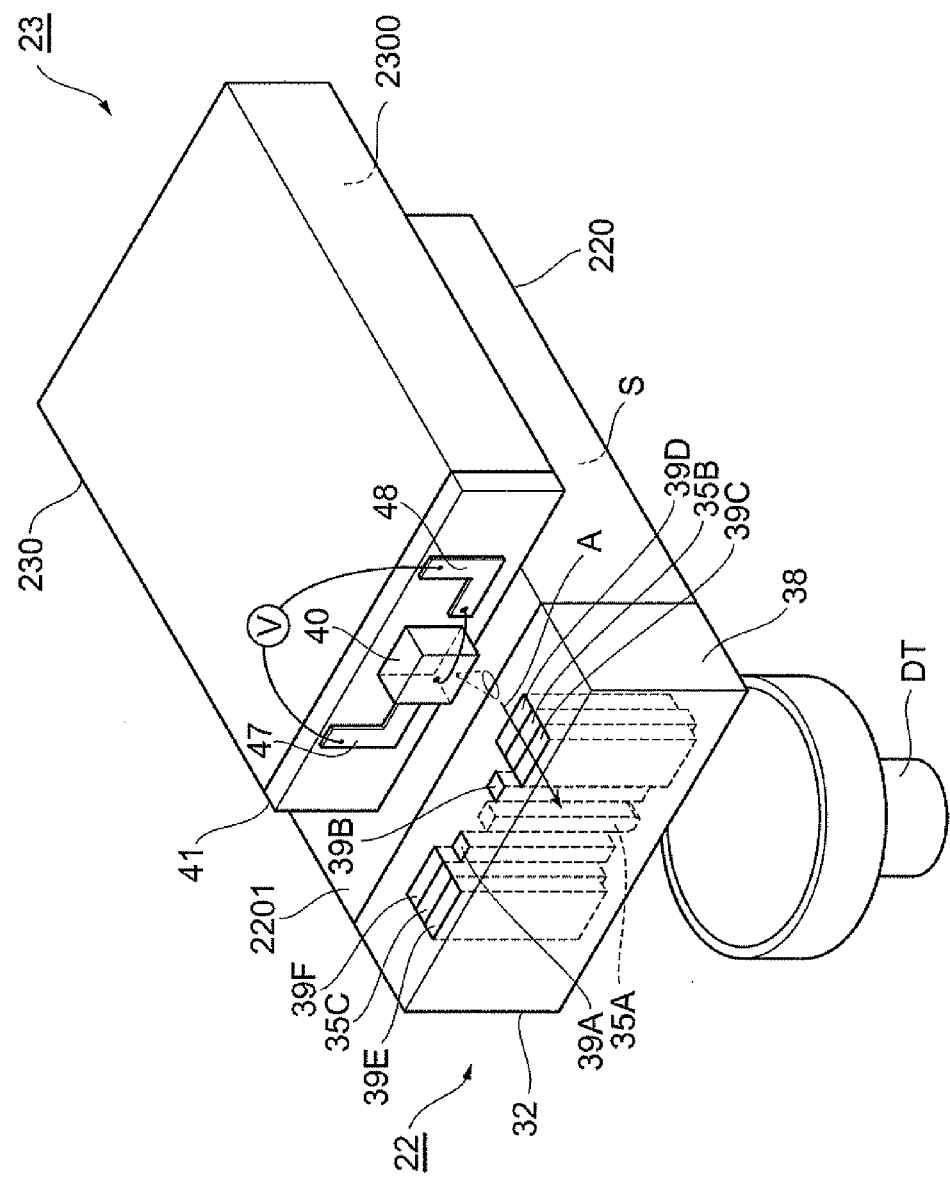
FIG. 10 is a view showing a step of manufacturing the thermally assisted magnetic head in accordance with an embodiment.

Specifically, as shown in FIG. 10, a photodetector DT such as photodiode is arranged on the medium-opposing surface S side of the slider 22. Then, a voltage is applied between the electrode pads 47, 48, so that the laser diode 40 emits light in a state where the back face 2201 of the slider substrate 220 and the bonding surface 2300 of the light source supporting substrate 230 are overlaid on each other, the light source unit 23 is moved (scanned) at a predetermined speed in the direction of arrow A (see FIG. 10 and (a) of FIG. 13) while the laser diode 40 keeps emitting the laser light so that the light shield 39D, optical waveguide 35B, and light shield 39C are successively irradiated with the laser light generated by the laser diode 40, and how the intensity of light transmitted from the back face 32a to the medium-opposing surface S or the like changes is detected by the photodetector DT.

Figure 13:
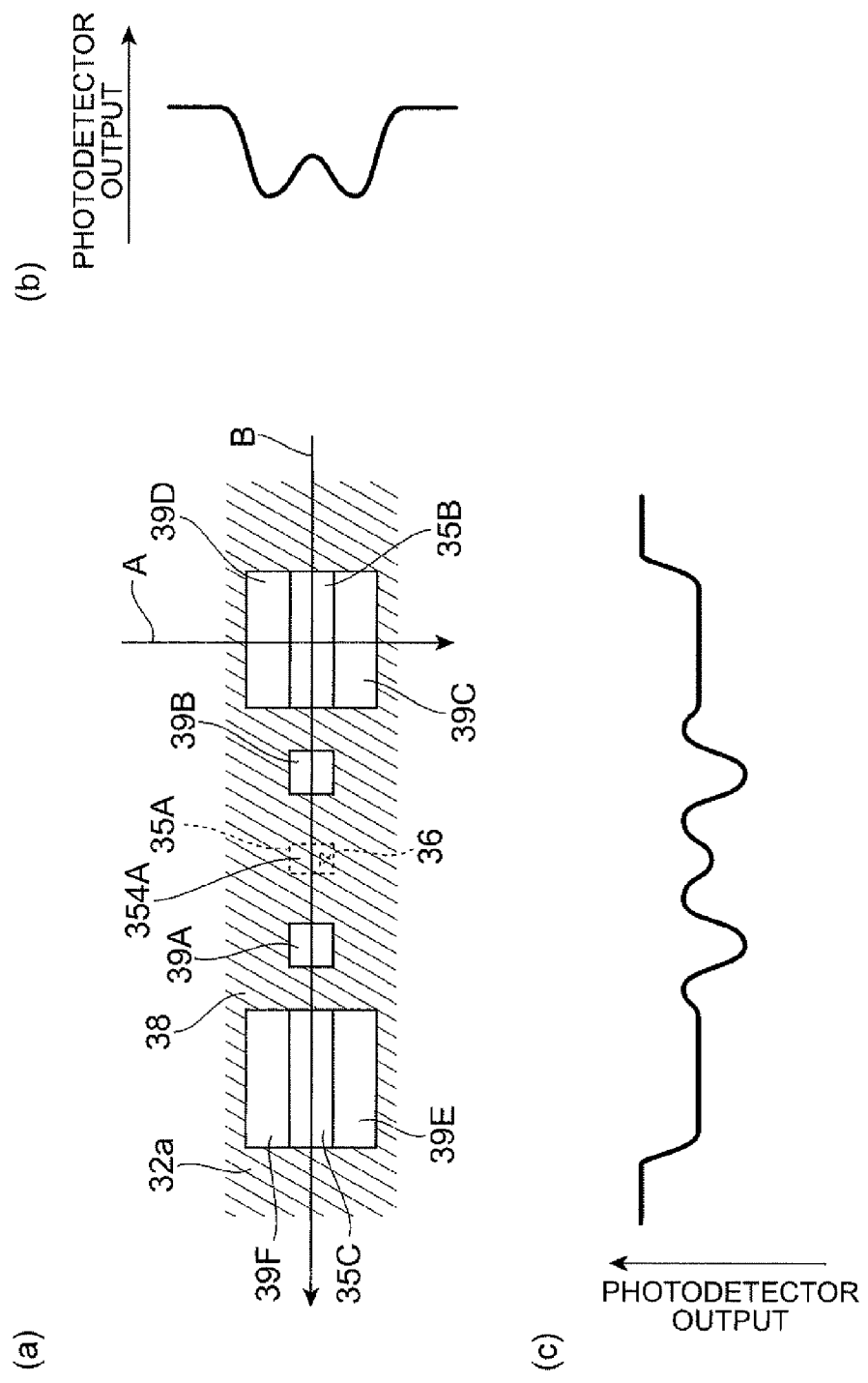

(b) of FIG. 13 shows the output of the photodetector DT at this time. As shown in (b) of FIG. 13, the output of the photodetector DT becomes the highest, substantially 0, and a predetermined level when the laser light irradiates the insulating layer 38, any of the light shield 39C, 39D, and the optical waveguide 35B, respectively. Therefore, a position between the light shields 39C, 39D, i.e., the position of the optical waveguide 35B can be specified. The reason why the output of the photodetector DT is higher when the laser light irradiates the insulating layer 38 than when irradiating the optical waveguide 35B lies in the facts that the optical waveguide 35B has a refractive index higher than that of the insulating layer 38 and that the laser light decays during when propagating through the optical waveguide 35B while repeating total reflection.

Figure 11:
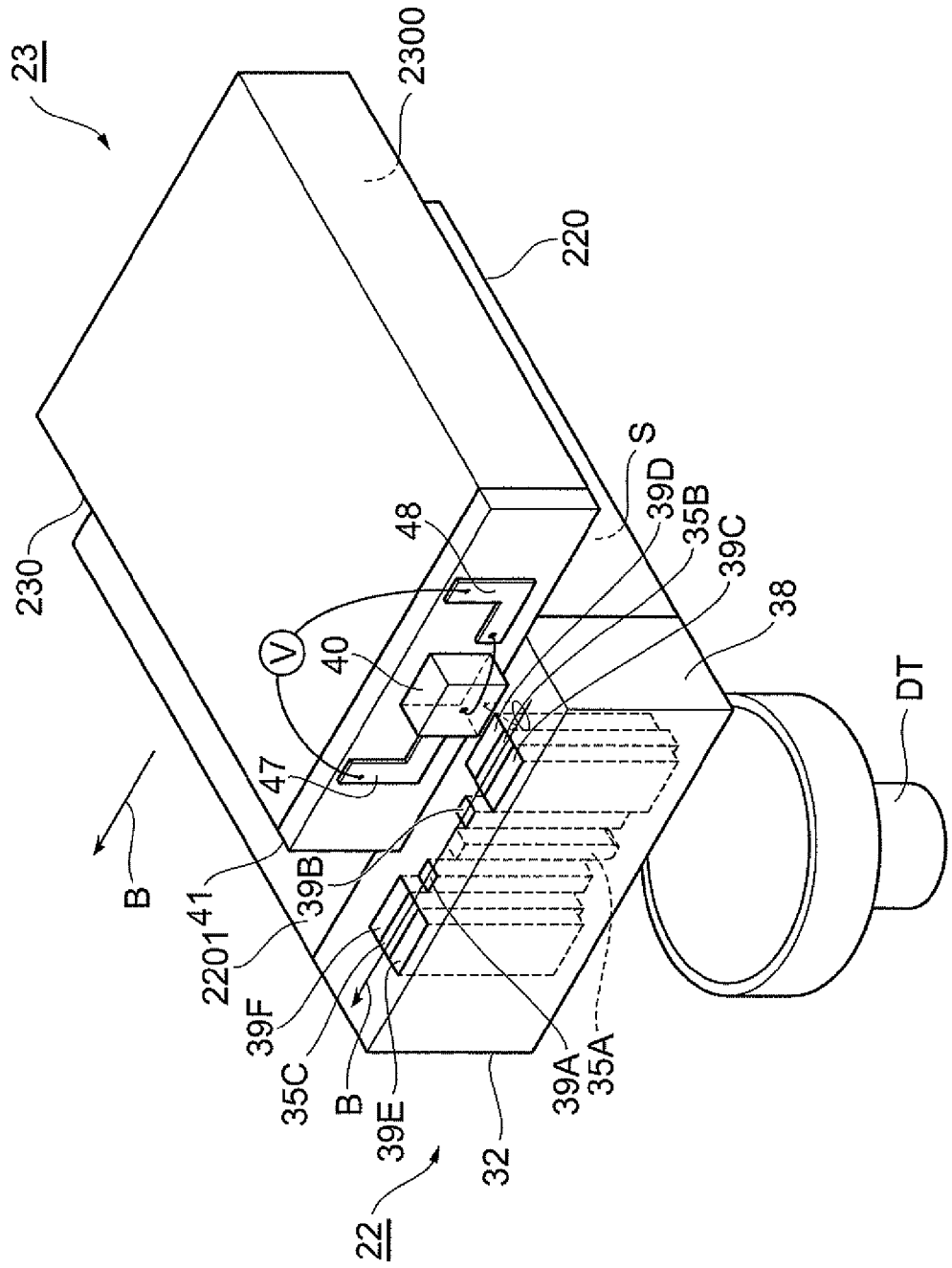
FIG. 11 is a view showing a step subsequent to that of FIG. 10.
Figure 12:
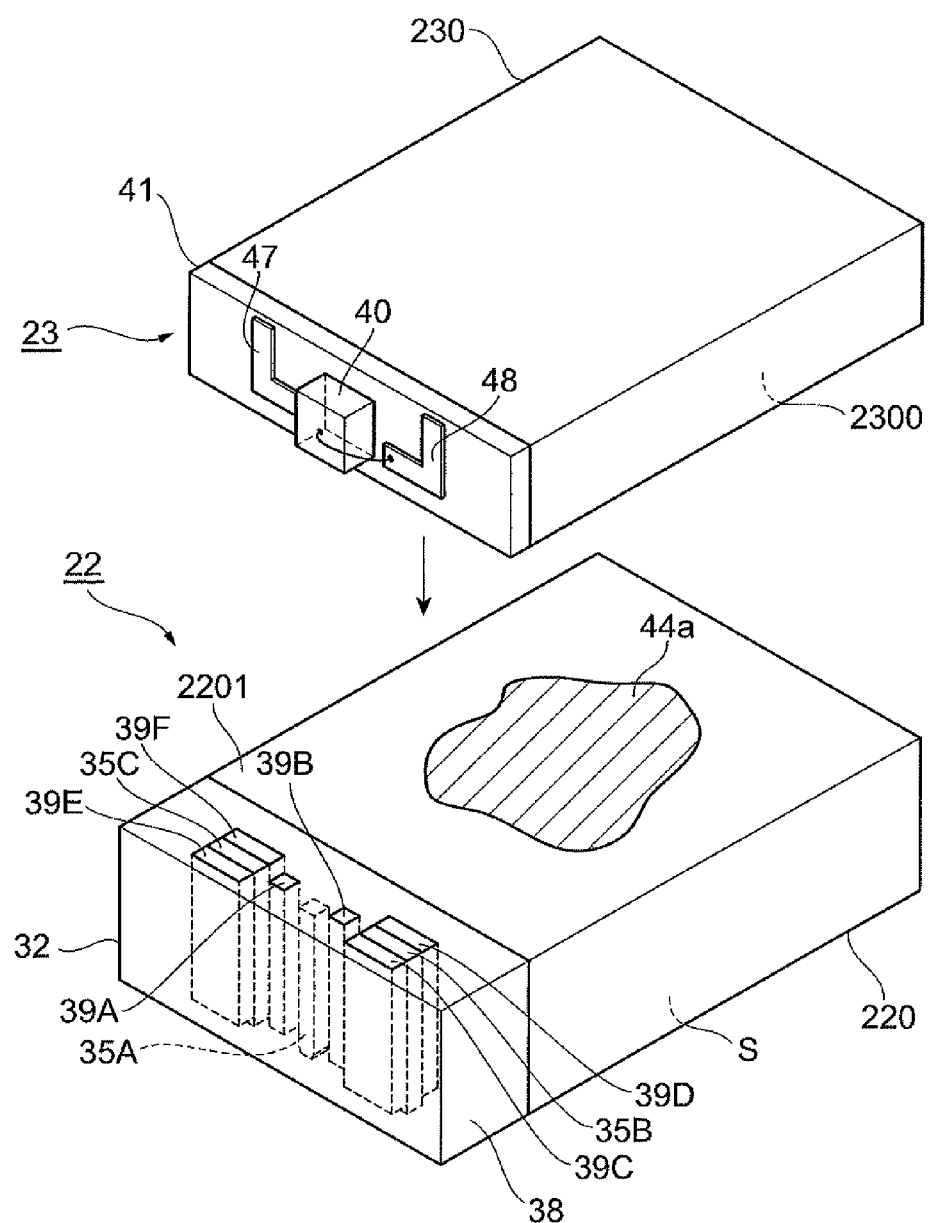
FIG. 12 is a view showing a step subsequent to that of FIG. 11; and (a) of FIG. 13 is a partly enlarged view of the optical waveguides and light shields as seen from the back face of the magnetic head part, (b) of FIG. 13 is a chart showing how the output of a photodetector changes when a light source unit moves in the direction of arrow A, and (c) of FIG. 13 is a chart showing how the output of the photodetector changes when the light source unit moves in the direction of arrow B.

Next, a voltage is applied between the electrode pads 47, 48, so that the laser diode 40 emits light in a state where the back face 2201 of the slider substrate 220 and the bonding surface 2300 of the light source supporting substrate 230 are overlaid on each other, the light source unit 23 is moved (scanned) at a predetermined speed in the direction of arrow B (seen FIG. 11 and (a) of FIG. 13) while the laser diode 40 keeps emitting the laser light so that the gap (optical waveguide 35B) between the light shields 39C and 39D, light shield 39B, optical waveguide 35A, light shield 39A, and optical waveguide 35C are successively irradiated with the laser light generated by the laser diode 40, and how the intensity of light transmitted from the back face 32a to the medium-opposing surface S or the like changes is detected by the photodetector DT.

(c) of FIG. 13 shows the output of the photodetector DT at this time. As shown in (c) of FIG. 13, the output of the photodetector DT becomes the highest, substantially 0, and a predetermined level when the laser light irradiates the insulating layer 38, any of the light shields 39A, 39B, and any of the optical waveguides 35A to 35C, respectively. Therefore, a position between the light shields 39A, 39B, i.e., the position of the optical waveguide 35A can be specified. The reason why the output of the photodetector DT is higher when the laser light irradiates the optical waveguides 35B, 35C than when irradiating the optical waveguide 35A lies in the facts that the near-field-light-generating part 36 is provided at the light exit surface 353A of the optical waveguide 35A and that the light emitted from the light exit surface 353A of the optical waveguide 35A is near-field light, which is not a traveling wave and is hard to detect.

After the position of the optical waveguide 35A is thus specified, a UV-curable adhesive 44a which becomes the adhesive 44 when cured is applied to the back face 2201 of the slider substrate 220 and/or the bonding surface 2300 of the light source supporting substrate 230. Examples of the UV-curable adhesive 44a include UV-curable epoxy resins and UV-curable acrylic resins. The slider 22 and the light source unit 23 are aligned with each other such that the light exit end 400 of the laser diode 40 overlies the optical waveguide 35A when seen from the back face 32a (or the medium-opposing surface S). Subsequently, at this position, the back face 2201 of the slider substrate 220 and the bonding surface 2300 of the light source supporting substrate 230 are overlaid on each other.

Thereafter, the UV-curable adhesive 44a is irradiated with UV rays from the outside, so as to be cured, whereby the slider 22 and the light source unit 23 are bonded to each other. This forms the thermally assisted magnetic head 21.

[6] Operations

Operations of the thermally assisted magnetic head 21 in accordance with this embodiment will now be explained.

At the time of a writing or recording action, the thin-film magnetic head 21 hydrodynamically floats by a predetermined flying height above the surface of the rotating magnetic disk 10. Here, the ends of the reading head part 33 and recording head part 34 on the medium-opposing surface S side oppose the magnetic disk 10 with a minute spacing therefrom, so as to effect reading and writing by sensing and applying a data signal magnetic field, respectively.

When writing a data signal, the laser light propagated from the light source unit 23 through the optical waveguide 35A reaches the near-field-light-generating part 36, whereby near-field light is generated by the near-field-light-generating part 36. This near-field light enables thermally assisted magnetic recording.

When writing is performed on the magnetic disk 10 having a high coercivity by the thin-film magnetic head for perpendicular magnetic recording while employing the thermally assisted magnetic recording scheme, a recording density of 1 Tbits/inch$^2$ class, for example, can be achieved by extremely finely dividing recording bits.

In the foregoing embodiment, the optical waveguide 35B, light shield 39B, optical waveguide 35A, light shield 39A, and optical waveguide 35C are successively arranged on the same line $L_1$ when seen from the back face 32a (or the medium-opposing surface S). Also, in this embodiment, the light shields 39C, 39D are arranged such as to oppose each other while interposing the line $L_1$ (optical waveguide 35B) therebetween (i.e., the light shield 39C, optical waveguide 35B, and light shield 39D are successively arranged on the same line $L_2$) when seen from the back face 32a (or the medium-opposing surface S). Further, in this embodiment, the light shields 39E, 39F are arranged such as to oppose each other while interposing the line $L_1$ (optical waveguide 35C) therebetween (i.e., the light shield 39F, optical waveguide 35C, and light shield 39E are successively arranged on the line $L_3$) when seen from the back face 32a (or the medium-opposing surface S). Therefore, the light source unit 23 is moved (scanned) while the laser diode 40 positioned on the back face 32a side emits laser light such that the laser light emitted from the laser diode 40 initially irradiates the light shield 39D and then the light shield 39C, and how the intensity of laser light transmitted from the back face 32a to the medium-opposing surface S (the laser light transmitted through the magnetic head part 32) or the like changes is detected by the photodetector DT positioned on the medium-opposing surface S side, whereby a position between the light shields 39C, 39D (the position of the optical waveguide 35B) can be specified. Subsequently, the light source unit 23 is moved (scanned) while the laser diode 40 emits laser light such that the laser light emitted from the laser diode 40 passes the specified position (optical waveguide 35B) between the light shields 39C, 39D and travels along the line $L_1$, and how the intensity of laser light transmitted from the back face 32a to the medium-opposing surface S (the laser light transmitted through the magnetic head part 32) or the like changes is detected by the photodetector DT positioned on the medium-opposing surface S side, whereby the position of the optical waveguide 35A can be specified. Hence, the position of the optical waveguide 35A can be specified from two different directions, whereby the alignment between the laser diode 40 and the optical waveguide 35A can be adjusted with a very high accuracy. This can realize high-density writing onto the magnetic disk 10.

In this embodiment, the light shields 39A to 39F are exposed at the back face 32a. This allows each light shield to securely block the laser light emitted from the laser diode 40, since the light has such a property as to expand in a direction intersecting its advancing direction while advancing. As a result, the position of the optical waveguide 35A can be specified with a higher accuracy.

Though a preferred embodiment of the present invention is explained in detail in the foregoing, the present invention is not limited to the above-mentioned embodiment. For example, though the near-field-light-generating part 36 has a triangular form in the above-mentioned embodiment, the vertex 36v may be flattened to yield a trapezoidal form. Also employable is a so-called "bowtie" structure in which a pair of triangular or trapezoidal plates are arranged such that their vertexes or shorter sides oppose each other while being separated by a predetermined distance therebetween. In this "bowtie" structure, electric fields converge strongly at its center part.

As the near-field-light-generating part 36, a minute opening smaller than the wavelength of laser light may be provided on the medium-opposing surface S side of the optical waveguide 35A.

Though provided by one layer in this embodiment, the thin-film magnetic head 342 may be formed by two or more layers or as a helical coil.

The heat insulating layer 230a may be formed on the back face 2201 side of the slider substrate 220 or totally omitted.

For bonding the light source unit 23 and slider 22 to each other, adhesives other than the UV-curable adhesive, e.g., the solder layer made of AuSn or the like used for bonding the laser diode 40 and electrode pad 47 to each other, may also be employed.

The end face of the core part 35a on the medium-opposing surface S side is not required to be exposed at the medium-opposing surface S as long as the intensity of the light emitted from the optical waveguide 35A can be maximized.

Though the optical waveguides 35B, 35C are totally constituted by the same material as that of the core part 35a of the optical waveguide 35A, the parts of the optical waveguides 35B, 35C corresponding to the core part 35a may be not exposed at the back face 32a or not exposed at the medium-opposing surface S as with the optical waveguide 35A. The magnetic head part 32 may be free of the optical waveguides 35B, 35C.

The light shields 39A to 39F are not required to be exposed at the back face 32a and may be exposed at the medium-opposing surface S.

As long as the optical waveguide 35A and light shields 39A, 39B are arranged on the same line $L_1$, the light shields 39A, 39B are not required to be arranged so as to oppose each other while interposing the optical waveguide 35A therebetween.

It is apparent that various embodiments and modifications of the present invention can be embodied, based on the above description. Accordingly, it is possible to carry out the present invention in the other modes than the above best mode, within the following scope of claims and the scope of equivalents.

What is claimed is:

1. A thermally assisted magnetic head including a magnetic head part having a medium-opposing surface opposing a magnetic recording medium and a back face opposing the medium-opposing surface;
   wherein the magnetic head part comprises:
   an electromagnetic transducer;
   a first optical waveguide extending along the opposing direction of the medium-opposing surface and back face; and
   first, second, third, and fourth light shields positioned between the medium-opposing surface and back face and adapted to prevent light from passing between the medium-opposing surface and back face;
   wherein the first optical waveguide and the first and second light shields are arranged on a first line when seen from the medium-opposing surface or back face;
   wherein the first line is positioned between the third and fourth light shields when seen from the medium-opposing surface or back face; and
   wherein the third and fourth light shields are arranged on a second line substantially orthogonal to the first line when seen from the medium-opposing surface or back face.

2. A thermally assisted magnetic head according to claim 1, wherein the first optical waveguide is positioned between the first and second light shields when seen from the medium-opposing surface or back face.

3. A thermally assisted magnetic head according to claim 1, wherein each of the third and fourth light shields extends in a direction along the first line when seen from the medium-opposing surface or back face.

4. A thermally assisted magnetic head according to claim 1, wherein the first, second, third, and fourth light shields are exposed at the back face.

5. A thermally assisted magnetic head according to claim 1, further comprising a second optical waveguide extending along the opposing direction of the medium-opposing surface and back face;
wherein the second optical waveguide is positioned between the third and fourth light shields when seen from the medium-opposing surface or back face.

6. A head gimbal assembly comprising:
the thermally assisted magnetic head according to claim 1; and
a suspension for supporting the thermally assisted magnetic head.

7. A hard disk drive comprising:
the head gimbal assembly according to claim 6; and
a magnetic recording medium opposing the medium-opposing surface.

* * * * *